VOLTAGE/GROUND PLANE ASSEMBLY

Filed March 3, 1967 2 Sheets-Sheet 1

INVENTORS
D. S. GOODMAN
L. M. BORSUK
F. T. INACKER
BY
Donald M. Sandler
ATTORNEY

VOLTAGE/GROUND PLANE ASSEMBLY

Filed March 3, 1967 2 Sheets-Sheet 2

INVENTORS
D. S. GOODMAN
L. M. BORSUK
F. T. INACKER
BY Donald M. Sandler
ATTORNEY United States Patent Office 3,518,610
Patented June 30, 1970

3,518,610

VOLTAGE/GROUND PLANE ASSEMBLY

David S. Goodman, Doylestown, and Leslie M. Borsuk, Philadelphia, Pa., and Frederick T. Inacker, Los Alamitos, Calif., assignors to Elco Corporation, Willow Grove, Pa., a corporation of Delaware Filed Mar. 3, 1967, Ser. No. 620,481
Int. Cl. H05k *7/04;* H01r *25/06*
U.S. Cl. 339—17 14 Claims

ABSTRACT OF THE DISCLOSURE

An electrical contact that must pass through a pair of superposed insulated metal plates is electrically and mechanically connected to a selected one of the plates by means of a metallic bushing whose length is no less than the thickness of the plates. The bushing, which is mechanically connected to the contact, makes an interference fit with a mounting hole in the selected plate. Aligned with the mounting hole in the selected plate is a larger sized clearance hole in the other plate such that the metallic bushing passes through the other plate without making electrical contact therewith. With this arrangement, bushings of identical size can be used regardless of which plate the contact is to be electrically connected to.

This invention relates to the mechanical and electrical interconnection of electrical contacts to a selected one of a plurality of superposed insulated metallic plates.

Combinational networks which form building blocks for digital computers are sometimes assembled by suitably interconnecting groups of printed circuit boards on which various circuit components are mounted. In such case, it is conventional to plug each printed circuit board into a connector mounted on the front face of a metal plate which serves to establish a ground plane for the electrical circuits on the printed circuit boards as well as to provide a mechanical support for the assembled printed circuit boards and connectors. Each connector has a casing of insulating material in which are mounted a plurality of contacts each of which has a tail section that passes through and extends beyond the rear face of the metal plate upon which the connector is mounted. The tail sections of the contacts are usually square or rectangular in cross-section for permitting conventional automatic back-panel wiring techniques, such as solderless wrapping or the like, to be used to establish the required combinational network and to permit power and signal inputs to be applied to the network as well as signal outputs to be taken therefrom.

To attach the insulated casing of a connector to the metal plate, it is conventional to provide the casing with a series of hubs that project into respective apertures in the metal plate. Such hubs may have an interference fit with the apertures and may be held to the plate by friction. Each hub is apertured to receive a contact whose body section may be provided with a barb or the like to engage the walls defining the aperture in the hub and thus retain the contact to the hub. In this manner, each contact is mounted on, but insulated from, the metal plate. When, however, a contact must be grounded, the hub of the insulated casing is usually removed at the location where the ground must be made, and a metal bushing is substituted for the hub. Such bushing may be pressed or otherwise securely attached to the contact to obtain good electrical engagement; and the contact so utilized is termed a "ground contact" for reference purposes. The metal bushing then may be pressed into an aperture in the metal plate to obtain good electrical engagement therewith thus establishing electrical continuity between the metal plate and the circuit on the printed circuit board connected to the ground contact. In this manner, all the circuits on the plurality of printed circuit boards which must be grounded, are connected to the metal plate.

In apparatus of the type described, each printed circuit board generally requires one or more power inputs, and usually a voltage bus, in the form of a relatively heavy metal bar, interconnects all of the contacts mating with the particular conductive pad on the printed circuit boards requiring power at the same voltage level. These contacts to which a voltage bus is connected are termed "voltage contacts" for reference. The disadvantage of this arrangement lies in its effect on the output impedance of the power supply. Such impedance is a function mainly of the capacitance of the voltage bus with respect to ground, and its inductance. Because this impedance loads the switching circuits on the printed circuit boards, it should be as low as possible in order to minimize its effect on pulse rise-time and keep from introducing limiting effects on the switching speed of the circuits.

In order to reduce this impedance by increasing the capacitance to ground and decreasing the inductance, a "voltage plane" can be utilized instead of a bus as a means to distribute power. Such voltage plane is in the form of a metal plate that underlies the ground plane and is separated therefrom by a thin layer of dielectric. This configuration, by its nature, provides a high capacitance to ground, and a low inductance and resistance, factors that prevent the voltage distribution system from adversely loading the circuitry on the printed circuit boards. The problem with this approach has been to provide an inexpensive and reliable electrical connection between a voltage contact and the voltage plane which underlies the ground plane, while at the same time isolating the voltage contact from the ground plane. At the same time, each ground contact must be reliably connected to the ground plane but be isolated from the underlying voltage plane through which the contact tail passes. It is the solution of these problems to which the present invention is directed.

The present invention solves these problems, in part, by providing aligned but different sized apertures in the ground and voltage planes at the location of each voltage and ground contact. For a ground connection, the aperture in the upper plate constituting the ground plane is the smaller; and for a voltage connection, the aperture in the lower plate constituting the voltage plane is smaller. However, all of the smaller apertures are the same, as are all of the larger apertures. Identical metallic bushings are pressed or otherwise attached to the body portions of the contacts, the outer size of the bushings being somewhat larger than the smaller holes. Such bushings, with the contact pre-assembled therein, can then be inserted into the aligned apertures at each location. At a ground location, the bushing interferes with the hole in the ground plane establishing electrical continuity between the contact and the ground plane, while the hole in the voltage plane clears the bushing. On the other hand, at a voltage location, the hole in the ground plane clears the bushing, while the hole in the voltage plane interferes to establish electrical continuity between the contact and the voltage plane.

The metallic bushings are also provided with shoulders to limit their insertion into the ground plane and thus position the nose of the contact at a precise elevation above the ground plane where it will mate properly with a conductive pad on a printed circuit board. For a voltage contact, the hole in the ground plane may be too large for the shoulder of the bushing, and in such case a stand-off insulator bushing is slipped over the metallic bushing prior to insertion. In such case, one end of the stand-off insulator rests on the voltage plane and the other end is engaged with the shoulder on the bushing. The height of the insulator bushing is selected so that it positions the shoulder of the metallic bushing exactly even with the front face of the ground plane.

The more important features of this invention have thus been outlined rather broadly in order that the detailed description thereof that follows may be better understood, and in order that the contribution to the art may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention.

For an understanding of the invention, reference is made to the following detailed description which should be considered in connection with the accompanying drawings, wherein.

Figures 1, 3, 4, 5:
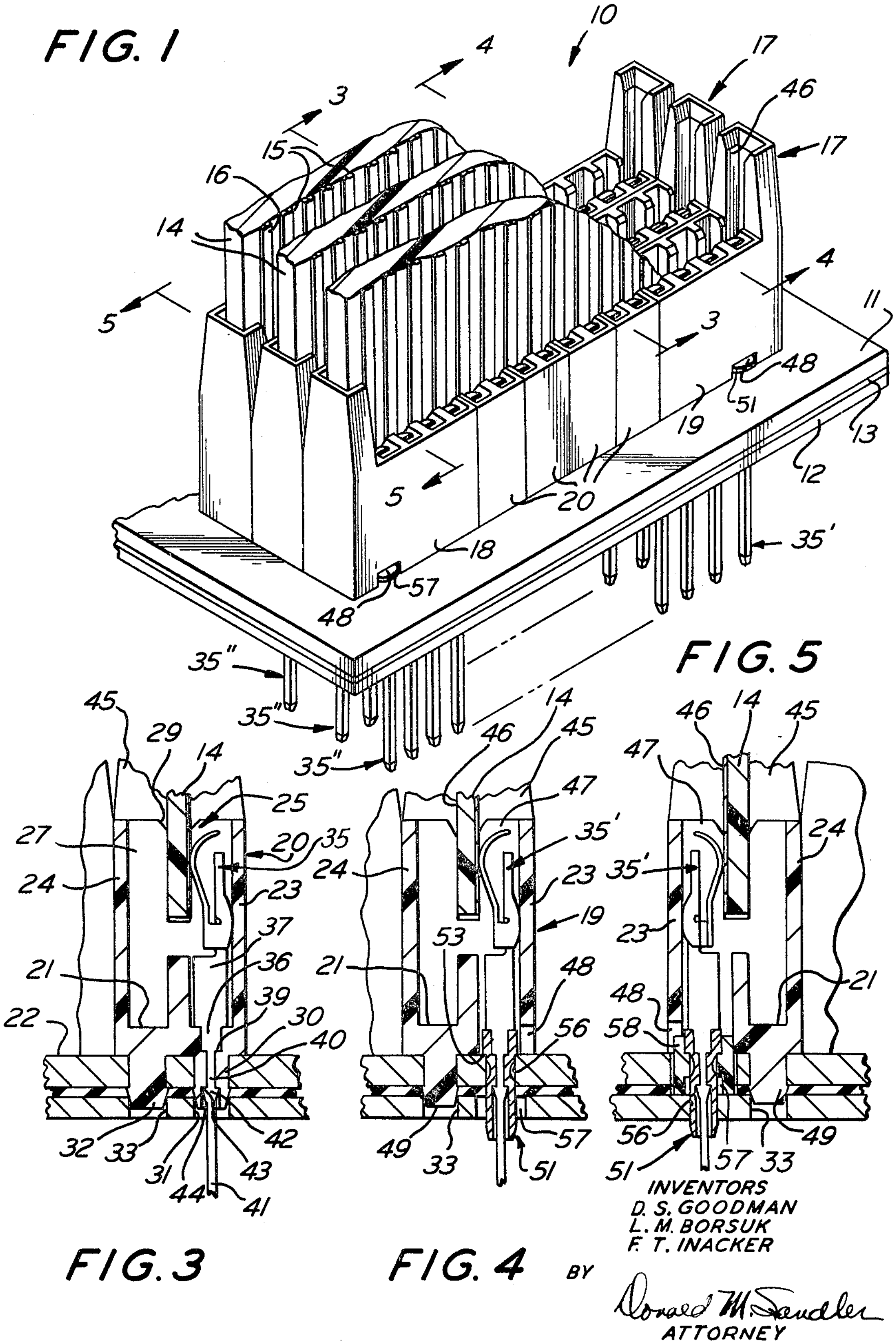
FIG. 1 is a perspective view of a connector assembly mounted on overlying metal plates.
FIG. 3 is a section taken along the lines 3—3 of FIG. 1.
FIG. 4 is a section taken along the lines 4—4 of FIG. 1.
FIG. 5 is a section taken along the lines 5—5 of FIG. 1.

Referring now to the drawings, FIG. 1 shows a printed circuit board connector assembly 10, into which the present invention is incorporated, mounted on upper and lower superposed metallic plates 11 and 12 separated by an insulated layer 13 by which the plates are adapted to be maintained at different potentials. Upper plate 11, which is indicated as being somewhat heavier, is usually the ground plane; and lower plate 12, somewhat thinner, is usually the voltage plane. Actually, the order of the plates and their relative thicknesses are not significant factors in this invention.

Figures 2, 6, 7:
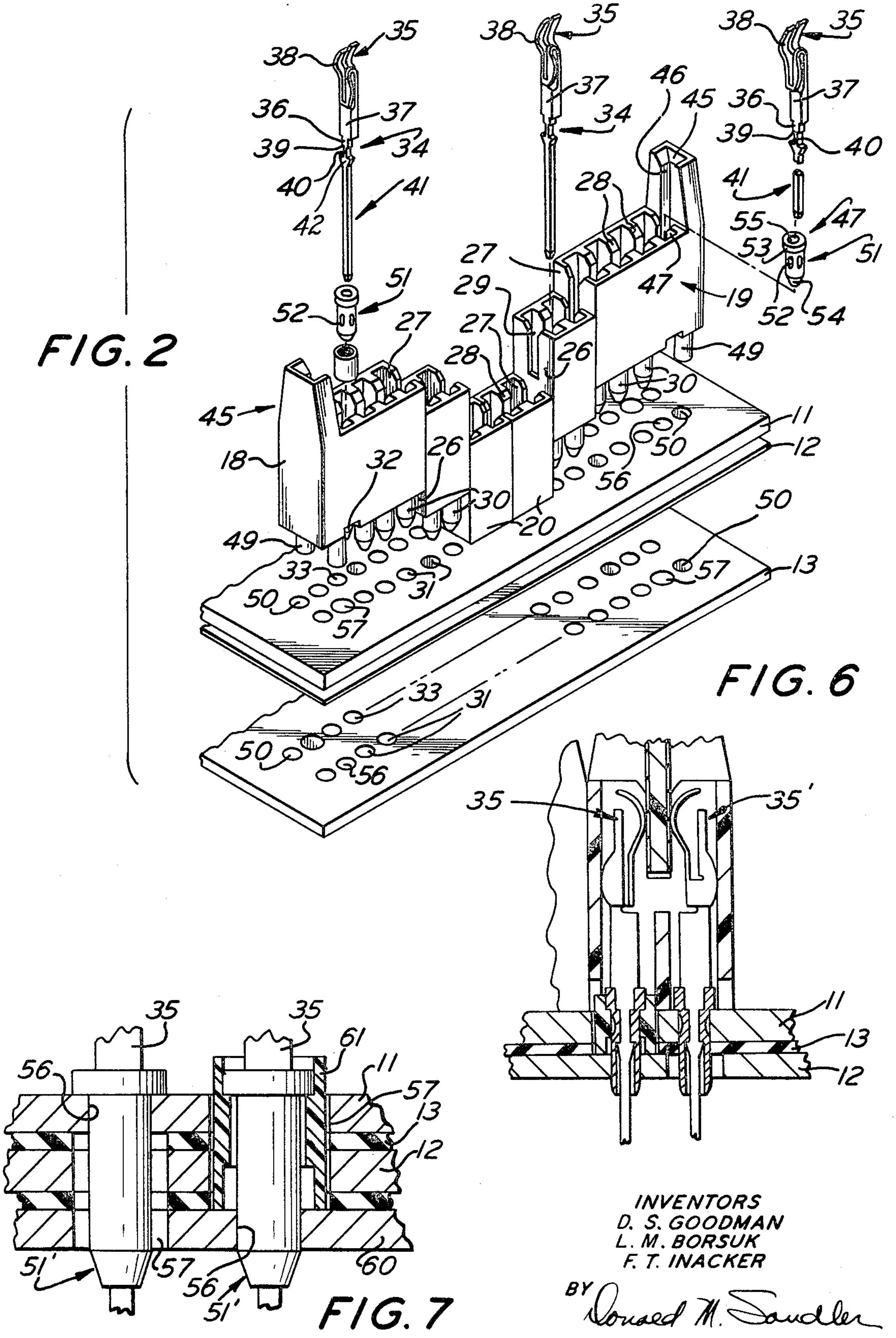
FIG. 2 is an exploded showing in perspective of a connector mounted on metal plates.
FIG. 6 is a section view of a card-edge guide showing ground and voltage contacts located at the same longitudinal position but on opposite sides of the printed circuit board illustrating a dual read-out configuration.
FIG. 7 is another embodiment showing how the invention can be applied to three metal plates.

One edge of each of a plurality of printed circuit boards 14 is shown plugged into connector assembly 10, this edge having a plurality of conductive pads 15 thereon, the voltage pad 16 being on the left side of the connector as viewed in FIG. 1, and the ground pad (not shown) being on the right side. The printed circuit board shown in FIG. 1 has pads 15 on one surface only, and requires single-sided read-out, although insulated casing 17 may be modified to accommodate dual read-out as shown in FIG. 6 in the event a double sided printed circuit board is used.

Each casing 17 of connector assembly 10 is modular to accommodate printed circuit boards of various lengths, the modular feature being achieved because insulated casing 17 comprises three types of parts: a pair of opposite-hand end guides 18, 19, and a plurality of separate center guides 20. Each of guides 18, 19, and 20 have a bottom wall 21 that rests on the top surface 22 of plate 11, and a pair of spaced longitudinal side-walls 23, 24 that are attached to the bottom wall and extend in a perpendicular direction from surface 22. Walls 23, 24 define an elongated recess 25 that receives the edge of printed circuit board 14 having pads 15, 16 thereon. Guides 20 also include transverse end walls 26, 27 and transverse medial wall 28 that is centrally located in recess 25 to establish two longitudinally spaced contact compartments. The walls 26, 27, and 28 are all perpendicular to the plane of the printed circuit board and have slots 29 at the free ends of the walls remote from bottom wall 21 for receiving the edge of the printed circuit board having pads 15 thereon. The closed ends of slots 29 provide stops that limit insertion of the edge of the printed circuit board.

Each of guides 20 includes a pair of longitudinally spaced apertured hubs 30 projecting from bottom wall 21 into aligned apertures 31 in plates 11 and 12, and a pair of longitudinally spaced plain hubs 32 that project into aligned apertures 33 in the plate. Hubs 30 and 32 are round and somewhat larger than holes 31 and 33 in plates 11 to establish an interference with the plate, such fit being sufficient to retain the guides to the metallic plates. The length of each of hubs 30 and 32 is somewhat more than the thickness of plate 11 so that the free end of each hub projects beyond the bottom surface of plate 11 (which is opposite to surface 22). Such free end may be slightly larger than holes 31 and 33 in plate 11 to create a shouldered flange that locks behind the bottom surface of plate 11. Preferably, the free ends of hubs 30 are tapered to provide "lead-in" that facilitates insertion of hubs into apertures 31 and 33. The engagement of the hubs with holes 31 and 33 serves to retain the bushing to plate 11 and plate 12 to plate 11. The latter situation arises because of the large number of hubs 30 per plate 12. In a preferred embodiment, the hubs 30 and 32 are .125" long and .073" in diameter, while plate 11 is .080" thick with holes 31 and 33 being .072" in diameter.

When guides 20 are to be used in a double read-out situation, the two longitudinally spaced hubs 32 are also apertured. In the shown embodiment, however, only hubs 30 are provided with apertures to receive the body section 34 of a contact 35. In a preferred form, the contact is stamped from a sheet of two-stage material. The thicker material forms the body and tail sections, while the thinner material forms the mating portion of the nose section. Basically, body section 34 of contact 35 has three main portions all of which have the same thickness: retention portion 36 of a width somewhat smaller than the width of the base 37 of the nose section 38 to establish shoulder 39 spaced from base 37 a distance about equal to the thickness of bottom wall 21, shank portion 40 of substantially the same width as the tail section 41, and truncated barb 42 which is spaced from shoulder 39 a distance somewhat greater than the thickness of plate 11.

When a contact is properly seated in the aperture in hub 30, the shoulder formed at the junction of the base 37 with retention portion 36, rests on the top of bottom wall 21 and barb 42 seats against shoulder 43 formed by relieved socket 44 at the free end of hub 30. The portion of the aperture in hub 30 connecting socket 44 to recess 25 is preferably of uniform cross-section about equal to the cross-section of tail section 41. Thus, retention portion 36 has an interference fit with bottom wall 21, and this interference fit plus the engagement of barb 42 behind shoulder 43 retains the contact to the bushing. Preferably, the contacts are seated in guides 20 before the latter are inserted into the plates. In a preferred embodiment, the thickness of the contact is .025", the width of retention portion 36 is .037", and the maximum width of the barb is .040".

Turning now to end guides 18 and 19, each has a transverse end wall 27 at one longitudinal end that matches end wall 27 on guides 20. The other longitudinal end of each of guides 18 and 19 has transverse guide wall 45 containing transverse slot 46 that slidingly receives an edge of a printed circuit board and serves as a guide therefor to limit longitudinal movement of the board in recess 25. Thus, the conductive pads 15, 16 on board 14 are accurately positioned relative to nose section 36 of the contacts. As shown in the drawing, each of end guides 18 and 19 have a number of longitudinally spaced transverse walls 28 to define a number of contact compartments. The preferred embodiment has three such transverse walls providing four pairs of contact compartments, although fewer or more transverse walls could be provided.

Each pair of compartments in an end guide, except one, has a pair of hubs 30 and 32 projecting outwardly from bottom wall 21 into aligned apertures 31 and 33 in plates 11 and 12. The single compartment 47 lacking a hub is the one that may contain either a ground or voltage contact. In the preferred embodiment, compartment 47 is adjacent guide wall 45, but actually, the compartment could be located anywhere in either the end guides 18 and 19 or even in a center guide 20. To provide clearance for the assembly of the ground and voltage contacts into the plate assembly 11, 12, and 13, bottom wall 21 is removed in compartment 47 to establish a clearance space 48.

End guides 18 and 19 are retained to the plate assembly in the same manner that guides 20 are retained, e.g., by the interference between hubs 30 and 32 and aligned apertures 31 and 33 in the two plates. Like guides 20, hubs 30 on guides 18 and 19 are apertured and are on the same side of these guides as compartment 47, the other hubs 32 being solid. Contacts 35 are held in hubs 30 of the end guides in the same manner as in the case of the center guides. The essential difference, then, between the end guides and the center guides is the lack of a hub at the desired location for a ground or voltage contact plus the provision of an extra pair of solid hubs 49 at the bottom of transverse guide walls 45, which hubs are frictionally receivable in apertures 50 in plates 11 and 12. In the preferred form of assembly, contacts 35 are pressed into each of apertured hubs 30 in the end guides, and the subassembly so formed is then pressed into the holes in metal plates 11 and 12.

As shown best in FIG. 1, assembly 10 comprises a plurality of insulated casings 17 arranged side-by-side on plates 11 and 12 so that the recesses 25 of the casings are laterally positioned across plates 11 and 12 permitting the printed circuit boards to be positioned in parallel planes. The preferred method of assembly is to insert the ground and voltage contacts at their proper locations in holes provided therefor in plates 11 and 12 prior to pressing the subassemblies of guides 18, 19, and 20 (each having contacts 35 preassembled therein) into metal plate 11. For the purposes of illustration, it is assumed that compartment 47 in guide 19 is to contain ground contact 35′ and compartment 47 in guide 18 is to contain voltage contact 35″ after the guides are attached to plate 11, and to accomplish this, contacts 35′ and 35″ are pressed into plates 11 and 12 at the proper locations so that when guides 18 and 19 are attached to plate 11, the voltage and ground contacts will occupy the proper compartment.

Contacts 35′ and 35″ each comprise a contact 35 and connection means whose nature establishes whether the contact 35 functions as a ground or a voltage contact. Briefly, the connection means includes aligned but different-sized apertures 56 and 57 in plates 11 and 12, and a metallic bushing 51. For a ground contact, the aperture 56, which is the smaller of the two aligned apertures and is the same size as apertures 31, is in the ground plane plaet 11, while aperture 57, which is larger than aperture 56, is in the voltage plane plate 12. On the other hand, for a voltage contact, aperture 56 is in the voltage plane plate 12, and aperture 57 is in the ground plane plate 11. Metallic bushing 51, however, is common to each connection means, and has a cylindrical body 52 whose diameter is slightly larger than the diameter of holes 56 in the metal plates but somewhat smaller than holes 57, and whose length is about the same as the combined thickness of plates 11 and 12, including insulation layer 13. At one axial end of body 52 is a shoulder 53 of the same thickness as the thickness of the bottom wall 21; and at the other axial end of body 52 is a tapered lead-in section 54 to facilitate insertion of bushing 51 into a hole 31. Bushing 51 is also provided with an axial bore 55 that is circular with a diameter providing a slight interference fit with retention portion 36 and barb 42 so that a contact 35 can be inserted into bore 55 and frictionally held at the proper depth.

Because a good electrical as well as mechanical connection must be made between contact 35 and bushing 51, the latter is crimped at spaced circumferential points to flow the metal of the bushing into tight engagement with shank 40 without substantial destruction of the cylindrical nature of body 52. As a consequence of this method of fabrication, the metallic bushing is securely attached to the contact to form a sub-assembly which is easily handled, and which can be used for either a ground or voltage contact. Other methods of mechanically and electrically securing a metallic bushing to a contact could be utilized, however. As indicated previously, the plate having the smaller hole size is the plate with which electrical engagement is made. Thus, two parallel rows of holes are provided in each of plates 11 and 12 for the hubs of guides 18, 19, and 20 making up one casing 17, and the hole spacing is the same in both plates. All of the holes are the same diameter, except at those locations where a ground or voltage contact is to be located. At such locations, larger holes 57 are provided.

Referring to FIG. 4, it can be seen that aperture 56 is in plate 11 and aperture 57 is in plate 12. Consequently, when contact sub-assembly 35/51 is pressed into aperture 56 to establish ground contact 35; shoulder 53 will seat on top surface 22. Nose 38 of the contact, thus, will be at the same elevation above surface 22 of plate 11 as the noses of contacts 35 inserted in hubs 30 of guides 18, 19, and 20 when the latter are attached to the plate, because of the thickness of shoulder 53. Furthermore, it will be evident that although body 52 of bushing 51 passes through plates 11 and 12, electrical engagement is made only with plate 11 because aperture 57 is larger than body 52.

Referring now to FIG. 5, it can be seen that aperture 56 is in plate 12 and aperture 57 is in plate 11. Consequently, when contact sub-assembly 35/51 is pressed into aperture 56 to establish ground contact 35″, and shoulder 53 is even with top surface 22, the nose 38 of the contact will be at the proper elevation above surface 22 of plate 11. While body 52 of bushing 51 passes through plate 11, it does not electrically engage the same because aperture 57 is larger than the body. To assist in easily positioning the bushing 51 when a voltage contact is to be established, it is preferred to utilize a cylindrical non-conductive bushing 58 whose outside diameter is slightly less than the size of aperture 57 and whose inside diameter is slightly more than the outside diameter of body 52 of bushing 51. Insulator 58 has an axial length at least equal to the combined thickness of plate 11 and insulating layer 13. In this manner, the insulator bushing 58 can serve as a stop to properly position the shoulder 53 of metallic bushing 51 above the upper surface of plate 12. In the preferred embodiment, the insulator 58 has a counterbore at each end so that a portion of the insulator shrouds the shoulder 53 and closes, to some extent, opening 48. The provision of a counterbore at each end, where the distance of the shoulder defining the counterbore at one end to the other free end of the bushing is equal to the combined thickness of plate 11 and layer 13, permits either end of the bushing to be slipped over the metallic bushing prior to insertion of the bushing into a hole 56 in the voltage plane plate 12.

The preferred method of assembly, after the required holes are made in the plates 11 and 12, is to insert the ground and voltage contacts where required. Next, the various guides, into which the contacts have been preassembled, are mounted on the plates, the clearance hole 48 in each compartment 47 providing clearance for the noses of the ground and voltage contacts.

In the event double-sided printed circuit boards are to be used, as shown in FIG. 6, all of hubs 30 and 32 in the guides are apertured. In this case, the conductive pads on opposite surfaces of the printed circuit board overlie each other, and it sometimes occurs that a voltage pad on one side of a printed circuit board overlies a ground pad on the opposite side. The arrangement shown in FIG. 6 can be used to advantage in this situation.

In FIG. 7, the invention is shown as applied to three overlying metal plates 11, 12, and 60 separated by insulating layers 13. In this case, metallic bushings 51' must have a length equal to at least the thickness of the superposed metal plates in order to be able to connect the bushing to a selected one of the plates. As shown in the drawing, the smaller hole 56 is in the plate to which electrical connection is to be made, and aligned larger hole 57 is in the other plates. Insulating bushing 61 may be used to shroud the metallic bushing when electrical connection is to be made with the second or third plate. While three plates are shown, it is obvious that the approach disclosed herein could be used with any number of plates.

We claim:

1. A connector assembly comprising:

(a) upper and lower superposed metallic plates separated by an insulation layer and adapted to be maintained at different potentials;

(b) at least two contacts, each of which has a nose portion connected to a tail portion by a body portion;

(c) aligned but different-sized aperture means in the upper and lower plates; and (d) a metallic bushing mechanically and electrically engaged with the body portion of each contact and having an interference fit with the smaller of the aligned aperture means for electrically and mechanically connecting the contact to the plate with the smaller aperture means.

2. The connector assembly of claim 1 wherein the metallic bushing engaged with each contact is crimped thereto.

3. The connector assembly of claim 1 wherein the metallic bushing engaged with one contact has the same size as the metallic bushing engaged with the other contact.

4. The connector assembly of claim 1 wherein the metallic bushing that has an interference with the upper of the two plates also has a shoulder that seats against the upper surface of the upper plate for positioning the contact engaged by the bushing relative to the superposed plates.

5. The connector assembly of claim 1 wherein each metallic bushing has a flanged end defining a shoulder at the end of the bushing adjacent the nose portion of the contact.

6. The connector assembly of claim 1 combined with a sub-assembly comprising an insulator having at least one apertured hub thereon, and a contact inserted into said apertured hub, at least said upper plate having an aperture into which the hub of the insulator is inserted for attaching the latter to the plates and mounting the contact inserted in the hub to the plates; said insulator having two relieved portions for accepting the noses of the contacts to which the metallic bushings are attached whereby the sub-assembly can be attached to the plate after the contacts, to which the metallic bushings are attached, are connected to the plate.

7. The connector assembly of claim 1 combined with a sub-assembly comprising an insulator having the slot and adapted to receive an edge of a printed circuit board that has conductive pads thereon, an apertured hub on said insulator corresponding to a conductive pad and a contact inserted into said apertured hub and having a nose portion adapted to engage the conductive pad, at least said upper plate having an aperture to which the hub of the insulator is inserted for attaching the latter to the plates and mounting the contact inserted in the hub to the plates; and means to effect attachment of the insulators to the plates after the contacts, to which the metallic bushings are attached, are connected to the plates.

8. The connector assembly of claim 1 wherein the connector means that includes the metallic bushing having an interference fit with the lower of the two plates, also includes an insulator bushing that surrounds the metallic bushing and lies between such bushing and the aperture means in the upper of the two plates.

9. The connector assembly of claim 8 wherein the metallic bushing that has an interference fit with the lower of the two plates also has a shoulder which bears against the upper portion of the insulator bushing, the lower portion of such insulator bushing bearing against the upper surface of the lower metallic plate and serving to position the contact engaged by the last mentioned bushing relative to the superposed plates.

10. A connector assembly comprising a pair of superposed metallic plates separated by an insulating layer and connected together to establish a mounting panel and a plurality of contacts each having a body portion that passes through respective aligned pairs of apertures in the plates, one aperture of an aligned pair of apertures being smaller than the other aperture of the pair, the body portion of a contact having electrically conducting means thereon which has an interference fit with only one of the apertures of the aligned pair of apertures for mechanically and electrically connecting the contact to only one of the said electrically conducting means on the body portion of the contact being in the form of a metallic bushing that mechanically and electrically engages the contact, and has an interference fit with the smaller aperture of the aligned pair of apertures plates.

11. A connector assembly according to claim 10 having an insulating bushing that fits over the metallic bushing and inside the larger aperture of the aligned pair of apertures for electrically insulating the contact from the plate within the larger aperture of said aligned pair of apertures.

12. A connector assembly according to claim 10, said metallic bushing having a shoulder that is larger than the smaller aperture of said aligned pair of apertures and serves to limit insertion of the bushing into the upper plate of the pair of plates when the smaller aperture of said aligned pair of apertures is in the upper plate.

13. A connector assembly according to claim 11 wherein the metallic bushing has a shoulder that is larger than the smaller aperture of the aligned pair of apertures, and the insulating bushing fits between the shoulder on the metallic bushing and the lower plate of the pair of plates when the smaller aperture of the aligned pair of apertures is in the lower plate whereby the shoulder is even with the upper plate of the pair of plates.

14. A connector assembly comprising a pair of superposed metallic plates separated by an insulating layer and having a plurality of aligned pairs of apertures, an insulating housing having at least one apertured hub thereon inserted into and frictionally engaging a first of said aligned pairs of apertures for attaching the housing to said plates, and a first contact having a body portion frictionally inserted into the apertured hub for attaching the first contact to said housing, one aperture of a second of said aligned pairs of apertures being smaller than the other aperture of said aligned pair and a second contact having a body portion that has electrically conducting means which makes an interference fit with the smaller aperture, and the housing further having a relieved portion aligned with the second of said aligned pairs of apertures whereby the housing and its contacts can be attached to the plates after the second contact is connected to the plates.

References Cited

UNITED STATES PATENTS

| | | | |
|---|---|---|---|
| 249,574 | 11/1881 | Blake | 339—18 X |
| 2,442,984 | 6/1948 | Paris | 339—18 |
| 3,049,645 | 8/1962 | Skirpan | 339—18 X |
| 2,965,751 | 12/1960 | Stiffel | 339—18 X |
| 3,237,146 | 2/1966 | Barker | 339—14 |
| 3,243,760 | 3/1966 | Dupre et al. | 339—17 X |

MARVIN A. CHAMPION, Primary Examiner

P. A. CLIFFORD, Assistant Examiner

U.S. Cl. X.R.

339—176